United States Patent [19]

Zeigler

[11] Patent Number: 4,992,520

[45] Date of Patent: Feb. 12, 1991

[54] METHOD FOR PREPARATION OF POLYSILANES

[76] Inventor: John M. Zeigler, 2208 Lester Dr., NE, Albuquerque, N. Mex. 87112

[21] Appl. No.: 432,674

[22] Filed: Nov. 7, 1989

Related U.S. Application Data

[63] Continuation-in-part of Ser. No. 851,713, Apr. 14, 1986, abandoned, and a continuation-in-part of Ser. No. 327,195, Oct. 14, 1988.

[51] Int. Cl.$^5$ ............................................... C08G 77/00
[52] U.S. Cl. ..................................... 528/10; 556/430; 528/33
[58] Field of Search ...................... 556/430; 328/10, 33

[56] References Cited

U.S. PATENT DOCUMENTS

| | | | |
|---|---|---|---|
| 2,554,976 | 5/1951 | Burkhard | 260/448.2 |
| 2,563,005 | 8/1951 | Clark | 260/2 |
| 2,606,879 | 8/1952 | Clark | 260/2 |
| 3,146,249 | 8/1964 | Alsgaard et al. | 556/430 |
| 4,260,780 | 4/1981 | West | 556/430 |
| 4,276,424 | 6/1981 | Peterson, Jr. et al. | 556/430 |

FOREIGN PATENT DOCUMENTS 8706234 10/1987 PCT Int'l Appl. ................ 556/430

OTHER PUBLICATIONS

J. M. Zeigler, "Mechanistic Studies of Polysilane Synthesis by Reproductive Coupling . . . ," Polymer Preprints, 27 (1), 1986, pp. 109–110.

*Primary Examiner*—Melvyn I. Marquis
*Attorney, Agent, or Firm*—Millen, White & Zelano

[57] ABSTRACT

High molecular weight polysilanes are prepared using highly non-chain-transferring solvents. Certain alloys of sodium can also be used to advantage with such solvents. The high molecular weights are achievable even in the commercially preferred "normal" addition procedure.

21 Claims, No Drawings

METHOD FOR PREPARATION OF POLYSILANES

CROSS-REFERENCE TO RELATED APPLICATION

This application is a continuation-in-part of U.S. application Ser. No. 06/851,713, filed Apr. 14, 1986, now abandoned and a continuation-in-part of PCT/US87/00850, filed Apr. 14, 1987, now U.S. application Ser. No. 07/327,195, filed Oct. 14, 1988, the disclosures of all of which being entirely incorporated by reference herein.

BACKGROUND OF THE INVENTION

In the above-mentioned applications, a variety of methods is provided for preparing polysilanes in improved yields and with high molecular weights and/or low polydispersities. These methods take advantage of both prior art knowledge and new discoveries based on recent mechanistic studies.

From the prior art, it was known that polysilanes could be prepared from Wurtz-type condensations in appropriate "inert" solvents such as aromatic and aliphatic hydrocarbons. The solid reacting surfaces enabling the polymerizations included the alkali metals, usually sodium or potassium and even alloys of these. From the mechanistic studies, it was also known that one mechanism for chain termination and, correspondingly, lower molecular weights than might be desired, was chain transfer to solvent, e.g., by hydrogen abstraction from activated C-H bonds. See, e.g., Zeigler, *Polymer Preprints*, 27 (1), 109 (1986), at 109, second column. While this was known to be a potentially important chain termination pathway, it was thought that other rate-affecting phenomena were greater contributors to loss of molecular weight, especially in normal addition systems where the monomer concentration when monomers were added to a dispersion of the solid were considered rate-limiting. The relative unimportance of chain transfer to solvent was demonstrated by the routine preparation of polymers with molecular weights $>10^6$ in simple alkane or aralkane solvents when the inverse addition method was employed. (Inverse addition refers to addition of solid reductant to monomer.) Other factors thought to be important included those influencing chain growth vs. chain initiation, polymer precipitation, and chain transfer to monomer in some cases.

Thus, for example, in Ser. No. 07/327,195, pages 24–26, published as WO87/06234 on Oct. 22, 1987, it is generically stated that solvents must not participate in chain transfer reactions. No differentiation is made among, for example, toluene, xylene, benzene, hexane, tetradecane, glyme, tetrahydrofuran (THF), etc., despite the different H-atom abstractabilities involved. All are mentioned equivalently as suitable "non-chain-transfer" solvents, i.e., as having H-atoms of sufficiently low abstractability to "not participate in chain-transfer reactions." In fact, toluene and alkanes are used predominantly in the work reported in this application despite the increased H-abstractability of these solvents vis-a-vis, for example, the equivalently mentioned benzene.

Moreover, in Example 9 of the latter application, the results of polysilane polymerizations using a sodium amalgam (1:1, Na/Hg) in toluene and toluene/heptane mixtures are shown. It is concluded on page 32 of Ser. No. 327,195 that the products from a polymerization using such an alloy are no different from those using the customary sodium per se.

Other workers have also utilized non-chain-transfer solvents as defined in this application or solid alloys without obtaining any advantageous effects on yield of high molecular weight polysilanes. Burkhard (U.S. Pat. No. 2,554,976), for example, utilizes benzene, a rigorously non-chain-transfer solvent, in combination with sodium. He reports "high" molecular weights, but the stated values are only 318–3200 for insoluble polymers (see, e.g., column 3, line 57, column 5, line 3, column 4, line 27, column 4, line 50, inter alia). Clark (U.S. Pat. Nos. 2,563,005 and 2,606,879) generically reports the possibility of using a eutectic alloy of sodium and potassium but reports no results. Clark employs toluene or xylene as solvents. The potassium/sodium eutectic has a composition 78/22 K/Na w/w. West (U.S. Pat. No. 4,260,780, Example I) describes the preparation of a poly(phenylmethylsilane co-dimethylsilane) using Na/K alloy (78% K) in THF. Molecular weights/yields are not stated. However, West et al. (U.S. Pat. No. 4,324,901) subsequently report that use of potassium in small amounts causes polymer degradation. Use of pure potassium or sodium-potassium alloy (78% K) is reported to result in extensive crosslinking to produce an insoluble and infusible polymer. West et al. conclude that the amount of potassium should not exceed 1% by weight (column 1, line 62-column 2, line 5). Peterson, Jr. et al. (U.S. Pat. No. 4,276,424) utilize lithium or lithium-alkali metal alloys to prepare polysilanes in THF. However, their method has a tendency to produce almost exclusively cyclic rather than linear polysilanes (col. 3, lines 10–12).

Heretofore, a preferred manner for preparation of polysilanes in terms of yields of high molecular weights and/or low polydispersities is that of U.S. application Ser. No. 07/327,195, e.g., as exemplified in its Table 2, reproduced below (alkane solvents):

| | NORMAL vs. INVERSE ADDITION MODES IN POLYSILANE SYNTHESIS | | | | |
|---|---|---|---|---|---|
| MONOMER | SOLVENT | ADDN MODE | POLYMER YIELD (%) | MODAL MW ($\times 10^{-3}$) | $\overline{M}_n$, $\overline{M}_w$ ($\times 10^{-3}$) |
| PhMeSiCl$_2$ | Toluene | I | 10 | 500 | |
| | | N | 23 | 42, 15 | |
| | Dodecane | I | 43 | 60 | |
| | | N | 95 | 100, 6 | |
| 4-anisyl MeSiCl$_2$ | Toluene | I | 4.7 | 30 | |
| | | N | 18.5 | | 2.7, 18.7 |
| n-dodecyl MeSiCl$_2$ | Toluene | I | 5.2 | 300 | |
| | | N | 1.5 | | 74, 470 | and in its Table 6, reproduced below (toluene solvent):

| INVERSE vs. NORMAL ADDITION IN (PhMeSi)$_n$ SYNTHESIS | | |
|---|---|---|
| ADDITION RATE (Meq/Min) | INVERSE ADDITION MODAL MW ($\times 10^{-3}$) | NORMAL ADDITION MODAL MW ($\times 10^{-3}$) |
| 80 | 600 | |
| 160 | 2000 | 3.4 |
| 320 | 600 | |
| 640 | 2000,210 | 4.0 |

As can be seen, heretofore, the inverse addition mode has been significantly preferable to the normal addition mode even using the state of the art methods of U.S. application Ser. No. 07/327,195.

Accordingly, there has remained a need to improve and/or facilitate prior art methods for preparing polysilanes, especially by the commercially preferable normal addition mode.

SUMMARY OF THE INVENTION

It has now been discovered that preparation of polysilanes using the combination of an alloy of solid surface-reacting agents, preferably an alloy of sodium, and a rigorously non-chain-transfer solvent, or more generally using such a solvent and any effective solid surface-reacting agent, enables the preparation of high (improved) yields of high molecular weight polymers having low polydispersities, even in the more commercially preferable and convenient normal mode addition. Thus, even where prior art methods (normal or inverse addition) produce relatively high molecular weights, e.g., $\overline{M}_w > 100,000$ by normal addition procedures, use of this invention's methods will improve the product, e.g., will increase its molecular weight.

Thus, in one aspect, this invention relates, in a process for preparing a soluble, substantially linear polysilane comprising polymerizing silane monomers on a solid surface-reacting agent in a reaction medium, to the improvement wherein the reaction medium is chain-transferring to a degree less than the degree of chain transfer caused by a medium whose sole pathway of chain transfer is H abstraction from unactivated alkane methylene groups, and the solid surface-reacting agent is an alloy of sodium and a second metal. Preferably, the weight ratio of sodium to second metal will be sufficiently high to avoid substantial chain degradation (e.g., loss of linearity by cyclization of chains, crosslinking, decrease in molecular weight and the like) compared to polysilane chains produced by polymerization of said silane monomers using unalloyed sodium in said medium under essentially the same conditions and sufficiently low to increase yield of maximum obtainable polysilane molecular weight and/or minimum obtainable polydispersity compared to the yield of maximum obtainable molecular weight and/or minimum obtainable polydispersity achievable by polymerization of said silane monomers using unalloyed sodium in said medium under essentially the same conditions.

In another aspect, this invention relates, in a process for preparing a soluble, substantially linear polymer comprising condensation polymerizing monomers on a solid surface-reacting agent in a reaction medium, to the improvement wherein the reaction medium is chain-transferring to a degree less than the degree of chain transfer caused by a medium whose sole pathway of chain transfer is H abstraction from unactivated alkane methylene groups, and the solid surface-reacting agent is an alloy of sodium and a second metal. Preferably, the weight ratio of sodium to second metal will be sufficiently high to avoid substantial chain degradation compared to chains of the polymer produced by polymerization of said monomers using unalloyed sodium in said medium under essentially the same conditions and sufficiently low to increase yield of maximum obtainable polymer molecular weight and/or minimum obtainable polydispersity compared to the yield of maximum obtainable molecular weight and/or minimum obtainable polydispersity achievable by polymerization of said monomers using unalloyed sodium in said medium under essentially the same conditions.

In other aspects of this invention, an alloy is not required since merely utilizing a rigorously non-chain-transfer solvent as defined herein will, surprisingly, produce unexpectedly high molecular weights and/or low polydispersities. This aspect is in contradistinction to the prior art belief that a non-chain-transferability as low only as for instance that of toluene (the heretofore most commonly used simple solvent) was sufficient to eliminate chain transfer as a significant factor. That even lower non-chain-transferabilities are effective to significantly enhance reaction results is completely unexpected.

Thus, in another aspect, this invention relates to a process for preparing a soluble, substantially linear polysilane comprising polymerizing silane monomers by normal mode addition on a solid surface-reacting agent (preferably sodium) in a solvent which is chain-transferring to a degree less than the degree of chain transfer caused by a medium whose sole pathway of chain transfer is H abstraction from unactivated alkane methylene groups.

In a further aspect, this invention relates to a process for preparing a soluble, substantially linear polysilane comprising polymerizing silane monomers by inverse mode addition on a solid surface-reacting agent (preferably sodium) in a solvent which is chain-transferring to a degree less than the degree of chain transfer caused by a medium whose sole pathway of chain transfer is H abstraction from unactivated alkane methylene groups.

In this application, suitable rigorously non-chain-transferring solvents (or media) will produce a degree of non-chain-transfer, i.e., non-chain-termination, which is substantially greater than the heretofore acceptable degree of non-chain-termination provided by the commonly used solvents having aliphatic H atoms, particularly, toluene, xylene, tetralin and alkanes such as hexane, heptane, decane, tetradecane, etc., glyme, diglyme, triglyme, THF, etc. For example, suitable non-chain-transfer solvents per this invention will react with the reactive intermediates very much less readily than growing chains do under the conditions of a given polymerization, e.g., to a sufficiently low extent to enable preparation of a desired high molecular weight, (e.g., for many polysilanes, greater than 30,000 daltons in greater than 90% of the distribution) typically greater than 50,000, preferably greater than 100,000, most preferably greater than 1,000,000. Such solvents per this invention will contain only H atoms having an abstractability substantially less than that of H atoms on unactivated alkane methylene groups under the particular reaction conditions. Thus, they will typically be arenes having no H-bearing substituents other than other arenes. Typical examples include benzene, biphenyl, diphenyl ether, diphenyl sulfide, naphthalene, etc. Heterocyclic arenes such as pyridine, quinoline, etc., will also be useful in many cases. However, the latter in general are less preferred in view of increased potential for chain transfer by other non-H-abstraction pathways. Solvents containing aliphatic H atoms which are difficult to abstract can also be used, e.g., t-butylbenzene, but these are generally less preferred due to the presence of the methyl hydrogens. Of course, mixtures of solvents can be employed.

Unactivated alkane methylene H atoms herein essentially refer to those bonded to alkane methylene groups having as the other two substituents only other alkyl groups.

Clearly, solvents containing other active functional groups which can effect chain transfer by non-H-abstraction pathways are also not useful, e.g., solvents having Cl, $NO_2$, Br and other substituents incompatible with alkali metals. Typically, only very small chain transfer yields are necessary to produce unacceptable degradation in molecular weight. For any given candidate only routine preliminary experiments would be necessary to determine whether the desired properties are possessed in accordance with this invention, e.g., performance of a preliminary test using reactive silane species derived from unhindered dichlorosilane monomers by reduction with the appropriate alloy in the candidate solvent selected in accordance with this application, employing most preferably the normal addition procedure.

There is no precise weight ratio defining the relative amounts of the components of the alloy suitable for use in this invention. Given this invention, determination of suitable ratios will be routine. On the lower end of the sodium/other metal ratio range, the determining factor will be avoiding an amount of the second metal sufficient to cause degradative reactions in comparison to the nature of the polysilane chains which are produced by polymerizing the same monomers using unalloyed sodium in the non-chain-transfer solvent of interest under essentially the same conditions. Thus, as noted above by West for potassium, too much of the second metal will tend to cause degradative reactions of the polysilanes, e.g., by enhancing preparation of cyclics, breaking up high molecular weight chains, introducing crosslinking, and the like.

At the upper end of the range of suitable sodium/second metal ratios, an important factor is the need to utilize enough of the second metal to cause an increase in maximum achievable molecular weight in comparison with the maximum molecular weight achievable using unalloyed sodium in the selected non-chain-transfer solvent of interest under essentially the same conditions.

By the term "essentially the same conditions" is meant that the same conditions are employed for purposes of comparison except where necessarily different, e.g., where higher temperatures/pressures are necessary in order to accommodate a higher melting point, e.g., of sodium vis-a-vis an alloy. Thus, in such a comparison, all other variables known to have an effect on the polymerization results will be kept the same to the extent possible and reasonable using routine scientific considerations, e.g., relative amounts of reactants and solvent, addition mode, temperature, pressure, reaction times, particle sizes, purities of components, especially the surfaces of the solid reductant particles, etc. Since the polymerizations of this invention are very sensitive to many of these factors, care must be taken to ensure proper comparability, including repetitive, identical reaction runs where needed. Such comparisons will thus be routine. For example, where results from "identical" runs vary, a sufficient number of runs will be conducted to provide a statistically reliable average result; or where holding reaction temperatures the same in two compared systems would adversely affect comparability, e.g., only one system would thusly be conducted under the greatly preferred reflux conditions, then the temperatures used will not be identical but rather both systems would be run under reflux conditions effective for each since these are more comparable.

The term "substantially linear" has a meaning readily determinable by skilled workers in this field under the circumstances involved, e.g., it will normally refer to polymers wherein the shortest uninterrupted run of backbone atoms is at least about 10 times the length of the longest side chain. The term "soluble" also has its standard art-recognized meaning.

The "other metal" to be alloyed with sodium is not critical as long as the increased molecular weight per this invention is achieved by using the resultant alloy. More than a single "other metal" can also be used. Typically, these metals will be other metals which are effective to reduce dichlorosilanes, e.g., alkali metals, e.g., potassium, lithium, cesium or rubidium, titanium, magnesium, calcium and the like. Metals such as mercury which act merely as inert diluents are not included in this aspect of the invention.

For example, a suitable alloy of sodium and potassium is the one employed in the examples, 85/15 (Na/K). Also useful is a higher melting sodium potassium alloy (89/11). However, it will be more difficult to ensure completeness of reaction for such a higher melting alloy when its melting point is close to or substantially the same as the boiling point of the solvent, e.g., benzene as used in the examples. Generally, Na/K alloys having a weight ratio of 70/30 to 90/10 are useful. Typically, it is preferred to use an alloy melting 5°-10 C. lower than the boiling point of the chosen solvent.

The precise alloy ratio chosen will vary with the identity of the alloy component and the solvent used. The ratio can be determined routinely using the guidance of this application.

This invention is applicable to all polysilanes and to all conditions of polymerization. Thus, whereas the results are more startling for normal mode additions, smaller but still surprising improvements in molecular weights will also be achieved in inverse addition polymerizations of polysilanes. Suitable polysilanes include all polymers having a backbone containing at least two silicon atoms bonded to each other. Typical polysilanes are those disclosed in U.S. application Ser. Nos. 06/851,713, filed Apr. 14, 1986, now abandoned, and 07/327,194, filed Oct. 14, 1988 and U.S. Pat. No. 4,588,801, issued May 13, 1986, U.S. Pat. No. 4,761,464 (interrupted polysilanes), issued Aug. 2, 1988, and U.S. Pat. No. 4,820,788 (polysilylsilanes), issued Apr. 11, 1989, but are not limited thereto. The invention is also applicable to polygermanes and copolymers of germanes, stannanes, phosphines, etc., with silanes. See U.S. Pat. No. 4,761,464 in this regard.

In carrying out these polysilane polymerizations, unless indicated otherwise herein, all reaction conditions, including amounts of components, particle sizes, workup, etc., will be analogous to those in the prior art, e.g., as described in the various references mentioned herein. For example, the polymerizations are generally conducted using molten metal under reflux conditions. One additional major advantage of this invention, however, is that workup is substantially easier since the high molecular weight polymers are more easily purified and fractionated. These are the embodiments which are so desired for the important application of these polymers. Furthermore, since the alloys are preferably prepared just prior to a polymerization, the preferred clean surfaces described in U.S. application Ser. No. 07/327,195 are inherently achieved, thereby further enhancing yield of high molecular weight polymers. Also because of this fresh preparation of alloy, particle sizes tend to be somewhat larger than with commercial sodium dispersions, e.g., particle sizes are typically in the range of 5-20 times larger than the commercial preparations. However, this is believed not to be a critical aspect.

The polymerizations of this invention can also be combined with the preferred solvent selection technique of U.S. application Ser. No. 07/327,195, wherein the compatibility of the selected reaction medium with the polysilane is chosen to be substantially the same as the degree of compatibility of the polysilane with the medium which optimizes the yield of polysilane of a desired molecular weight and/or polydispersity. Details of selection of such an optimum compatibility and corresponding solvents are given in U.S. application Ser. No. 07/327,195. For example, mixtures of relatively weak chain transfer solvents such as the commonly used toluene and heptane solvents mentioned above with the more stringently non-chain-transfer solvents preferred by this invention could be employed in varying amounts to match the compatibility requirements of U.S. application Ser. No. 07/327,195. These mixtures would always include only small amounts of the prior art weak-chain-transfer solvents, e.g., typically less than 20 wt. %. In such situations, the molecular weight of the resultant polysilane could be substantially optimized in view of the beneficial effects of both the compatibility-based invention and this invention.

Thus, this invention represents a significant advance in that it optimizes preparation of polysilanes having the unique combination of properties desired for important uses thereof such as homogeneity, linearity, solubility, freedom from crosslinking, film formability, high molecular weight, low polydispersity, etc. Moreover, it accomplishes this while providing methods for preparing these materials reproducibly using the normal addition procedures. In addition, this invention provides polysilanes having a very high degree of end termination by Cl atoms upon completion of the coupling reaction since H-abstraction, which causes non-Cl termination, is greatly reduced. This in turn provides ease and control of replacement of these end chlorine atoms by other desired chemical moieties, e.g., thereby facilitating the production of block copolymers containing polysilane blocks.

The polysilanes of this invention are useful for all of the purposes mentioned for prior art polysilanes, including as photoresists, passivating layers, encapsulation, etc., and other uses in optoelectronics, microelectrics processing, photopatterning, advanced ceramics, chemical processing, etc.

Without further elaboration, it is believed that one skilled in the art can, using the preceding description, utilize the present invention to its fullest extent. The following preferred specific embodiments are, therefore, to be construed as merely illustrative, and not limitative, of the remainder of the disclosure in any way whatsoever.

In the foregoing and in the following examples, all temperatures are set forth uncorrected in degrees Celsius and, unless otherwise indicated, all parts and percentages are by weight.

The entire texts of all applications, patents and publications, if any, cited above and below, and of corresponding application(s), are hereby incorporated by reference.

EXAMPLES

EXAMPLE 1

Preparation of $(PhMeSi)_n$ Using 85/15 Na/K alloy in Benzene Solvent.

A mixture of 1.363 g sodium metal and 0.2405 g potassium metal is placed in a three-neck Morton flask equipped with nitrogen inlet, condenser, Hershberg stirrer, and addition funnel and having in place a dry nitrogen atmosphere. A sufficient amount of dry toluene to cover the metals is added to the flask and heated to reflux to melt the metals together. Once the metals are melted, they are stirred rapidly with the stirrer to disperse the resulting alloy in the form of fine particles. The mixture is then allowed to cool to room temperature under nitrogen atmosphere and the toluene decanted away. After washing the dispersed alloy with dry benzene and decanting, 100 ml dry benzene is added and the resulting benzene slurry heated to reflux while stirring rapidly. Upon achieving reflux, neat phenylmethyldichlorosilane (5 g, 26.2 mmole) is added dropwise at 320 meg/min via a syringe pump. After refluxing for 1.5 hr, the mixture is allowed to stand for 14 hr at ambient temperature. A small amount of methanol is added to destroy any excess metal alloy, followed by 100 ml of sat. aq. $NaHCO_3$ solution. Following filtration through filter aid, the layers are separated and the organic phase stripped of solvent on a rotary evaporator. Addition of 75 ml hexanes to the resulting oil yields 160 mg of a white solid. The infrared spectrum of this is identical to authentic poly(phenylmethylsilane). Size exclusion chromatography on a Ultrastyragel Linear column in THF flowing at 1 ml/min gives a weight average molecular weight of 1,351,000.

EXAMPLE 2

Using these procedures, except for changes in monomers or amounts of relative amounts of components in the alloy as indicated in the table below, the following results are achieved:

| HIGH MOLECULAR WEIGHT POLYSILANES USING Na/K ALLOY IN BENZENE | | | | |
|---|---|---|---|---|
| $R_1R_2SiCl_2 \xrightarrow[PhX]{Na/K} (R_1R_2Si)_n$ | | | | |
| Normal Addition 320 meq/min | | | | |
| $R_1, R_2$ | X | Na/K | $M_w (\times 10^{-3})$ | YIELD (%) |
| Ph,Me | H | 85/15 | 398 | 5.2 |
| Ph,Me | H | 85/15 | 1351 | 10 |
| Ph,Me | $CH_3$ | 85/15 | 25 | 32 |
| Ph,Me | H | 100/0 (min. spir. disp.) | 34 | 42 |
| Ph,Me | H | 50/50 | 83 | trace |
| Ph,Me | H | 89/11 | 2217 | 5.2 |
| n-Pr,Me | H | 85/15 | 88 | 1.8 |
| n-hexyl, | H | 85/15 | 3921 | 10 |

-continued

HIGH MOLECULAR WEIGHT POLYSILANES USING Na/K ALLOY IN BENZENE

$$R_1R_2SiCl_2 \xrightarrow[PhX]{Na/K} (R_1R_2Si)_n$$

Normal Addition
320 meq/min

| $R_1, R_2$ | X | Na/K | $M_w(\times 10^{-3})$ | YIELD (%) |
|---|---|---|---|---|
| n-hexyl | | | | |

The difference in results in the first two reactions is believed to be due to very minor amounts of impurities present at a level substantially impossible to control from reagent to reagent, further indicating the high sensitivity of polysilane Wurtz condensations to trace contaminants. As can be seen, when employing an alloy having a proper amount of potassium, very high molecular weights are achieved even in normal addition mode, in comparison to those achievable using pure sodium under essentially identical conditions. By comparison with Table 1 above, it can be seen that the results for normal addition using the alloy of this invention far surpass those achievable under the optimized conditions of the prior art, not only for normal addition, but also for the heretofore preferred inverse addition mode. This represents a significant advantage in view of the preference for the convenience of normal mode additions.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for preparing a soluble, substantially linear high molecular weight polysilane comprising polymerizing silane monomers on a solid surface-reacting agent in a reaction medium, the improvement wherein the reaction medium is chain-transferring to a degree less than the degree of chain transfer caused by a medium whose sole pathway of chain transfer is H abstraction from unactivated alkane methylene groups, and the solid surface-reacting agent is an alloy of sodium and a second metal other than sodium, whereby there is prepared a soluble, substantially linear polysilane having a molecular weight greater than 30,000.

2. A process of claim 1, wherein the weight ratio of sodium to second metal is: sufficiently high to avoid substantial chain degradation compared to polysilane chains produced by polymerization of said silane monomers using unalloyed sodium in said medium under essentially the same conditions; and sufficiently low to increase yield of maximum obtainable polysilane molecular weight and/or minimum obtainable polydispersity, compared to the yield of maximum obtainable molecular weight and/or minimum obtainable polydispersity achievable by polymerization of said silane monomers using unalloyed sodium in said medium under essentially the same conditions.

3. A process of claim 2, wherein polymerization is achieved by adding the monomers to a dispersion of said alloy.

4. A process of claim 2, wherein said second metal is an alkali metal other than sodium or is Ti.

5. A process of claim 3, wherein said second metal is an alkali metal other than sodium or is Ti.

6. A process of claim 2, wherein said second metal is K.

7. A process of claim 3, wherein said second metal is K.

8. A process of claim 7, wherein the weight ratio Na/K is 89/11 to 85/15 and the reaction medium is benzene.

9. A process of claim 8, wherein said weight ratio is about 85/15.

10. A process of claim 2, wherein said medium is an aromatic solvent.

11. A process of claim 10, wherein said medium is an aromatic hydrocarbon solvent having no aliphatic H atoms.

12. A process according to claim 7, wherein said medium is an aromatic hydrocarbon solvent having no aliphatic H atoms.

13. A process of claim 12, wherein said solvent is benzene, biphenyl, diphenyl ether, diphenyl sulfide, naphthalene or a mixture thereof.

14. A process of claim 7, wherein said solvent is an aromatic heterocyclic solvent having no aliphatic H atoms.

15. A process of claim 14, wherein said solvent is pyridine or quinoline.

16. A process of claim 2, wherein said reaction medium has a compatibility with the polysilane which is substantially the same as the degree of compatibility of the polysilane with the medium which maximizes the yield of polysilane of a desired molecular weight and/or polydispersity.

17. A process of claim 2, wherein the alloy is prepared just prior to said polymerization by heating the alloy metals in an inert dispersing solvent to a temperature higher than their melting points.

18. In a process for preparing a soluble, substantially linear high molecular weight polymer comprising condensation polymerizing corresponding monomers on a solid surface-reacting agent in a reaction medium, the improvement wherein the reaction medium is chain-transferring to a degree less than the degree of chain transfer caused by a medium whose sole pathway of chain transfer is H abstraction from unactivated alkane methylene groups, and the solid surface-reacting agent is an alloy of sodium and a second metal other than sodium, whereby there is prepared a soluble, substantially linear polymer having a molecular weight greater than 30,000.

19. A process for preparing a soluble, substantially linear high molecular weight polysilane comprising polymerizing silane monomers by normal mode addition on a solid surface-reacting agent in a solvent which is chain-transferring to a degree less than the degree of chain transfer caused by a medium whose sole pathway of chain transfer is H abstraction from unactivated alkane methylene groups, whereby there is prepared a soluble, substantially linear polysilane having a molecular weight greater than 30,000.

20. A process for preparing a soluble, substantially linear high molecular weight polysilane comprising polymerizing silane monomers by inverse mode addition on a solid surface-reacting agent in a solvent which is chain-transferring to a degree less than the degree of chain transfer caused by a medium whose sole pathway of chain transfer is H abstraction from unactivated alkane methylene groups, whereby there is prepared a soluble, substantially linear polysilane having a molecular weight greater than 30,000.

21. A process of claim 1, wherein the molecular weight of said polymer is greater than 50,000.

* * * * *